(12) United States Patent
Lakhani

(10) Patent No.: US 8,536,725 B2
(45) Date of Patent: Sep. 17, 2013

(54) COMPACT WIND AND WATER TURBINE SYSTEMS

(76) Inventor: Mehboob Lakhani, Houston, TX (US)

( * ) Notice: Subject to any disclaimer, the term of this patent is extended or adjusted under 35 U.S.C. 154(b) by 493 days.

(21) Appl. No.: 12/714,460

(22) Filed: Feb. 27, 2010

(65) Prior Publication Data

US 2011/0210557 A1    Sep. 1, 2011

(51) Int. Cl.
*F03B 13/00* (2006.01)
*H02P 9/04* (2006.01)

(52) U.S. Cl.
USPC .......................................................... 290/54

(58) Field of Classification Search
USPC ................................................ 290/44, 54, 55
See application file for complete search history.

(56) References Cited

U.S. PATENT DOCUMENTS

| | | | |
|---|---|---|---|
| 554,138 A | 2/1896 | Negbaur | |
| 847,140 A | 3/1907 | Williams | |
| 2,054,383 A | 9/1936 | Ludewig | |
| 3,876,925 A | 4/1975 | Stoeckert | |
| 4,234,289 A * | 11/1980 | Lebost | 415/4.4 |
| 4,299,198 A | 11/1981 | Woodhull | |
| 4,340,822 A | 7/1982 | Gregg | |
| 4,447,738 A | 5/1984 | Allison | |
| 5,213,470 A | 5/1993 | Lundquist | |
| 5,798,632 A | 8/1998 | Muljadi | |
| 5,998,903 A | 12/1999 | Umeda | |
| 6,285,090 B1 | 9/2001 | Brutsaert | |
| 6,400,039 B1 | 6/2002 | Wobben | |
| 6,455,946 B2 | 9/2002 | Taniguchi | |
| 6,465,901 B2 | 10/2002 | Croes | |
| 6,541,877 B2 | 4/2003 | Kim | |
| 6,740,995 B2 | 5/2004 | Oohashi | |
| 6,897,575 B1 | 5/2005 | Yu | |
| 7,566,980 B2 | 7/2009 | Fein | |
| 7,629,719 B2 | 12/2009 | Hamada | |
| 2006/0208581 A1 | 9/2006 | Ikuta | |

* cited by examiner

*Primary Examiner* — Javaid Nasri

(57) ABSTRACT

A fluid driven electrical generation system with most of the electrical generation components in an inner hollow of a housing that is driven to rotate by trapper structures that trap energy from the fluid.

1 Claim, 5 Drawing Sheets

COMPACT WIND AND WATER TURBINE SYSTEMS

CROSS REFERENCE TO RELATED APPLICATIONS

Benefit is claimed from U.S. Provisional Patent Application 61/208,796, filed Mar. 2, 2009, which is hereby incorporated by reference.

BACKGROUND

Common ways to produce electrical power from a rotor based apparatus are using turbines and alternators. Typical turbine system comprises of rotor blades that traps the wind flow or the water flow energy to do rotational motions, in order to generate electrical power.

Due to their spanning size they are not practical for moving vehicle. Most turbines rotor blades needs huge space to rotate, as disclosed, for example in, U.S. Pat. Nos. 4,447,738 (1984), 6,541,877 (2003), 6,400,039 (2002), 4,340,822 (1982), 2,054,383 (1936), 5,798,632 (1998), 4,299,198 (1981), 554,138 (1896), 5,213,470 (1993), 847,140 (1907), 6,465,901 (2002), and 6,285,090 (2001).

Thus these turbines need large space for stationary installations and it is not practical for use with any moving object in motion. Generally, those turbines that produce a high volume of electric current require huge structural space. These cost a significant amount of money and are more complex to operate and install.

Often, due to turbine's huge structure, wind or lightning contributes to its failure and knocks-out the whole turbine on the ground. This can be very serious safety issue.

Many turbine designs inner center-coils and outer coils (stators). In most scenarios the inner center-coil rotates and the outer-coil stays stationary.

To rotate inner center-coil it needs shaft with a rotor, with or without rotor blades. Rotor blades themselves occupy a huge space of the structure, and the shaft occupies huge length to rotate center-coil.

A common way to generate electrical power at large scale in this century is through wind turbines.

Power generation for smaller application like air/water surface and air based vehicles uses alternators. An alternator has a rotor, driven by belts to generate electrical power to provide power vehicle and charge battery. The rotor has to be driven by engine or other apparatus. Hence an alternator is not practical for capturing wind or water flow energy. See, for example, U.S. Pat. Nos. 6,897,575 (2005), 7,566,980 (2009), 5,998,903 (1999), 6,740,995 ((2004), 6,455,946 (2002), 7,629,719 (2009), 20060208581 (2007).

SUMMARY

The present compact wind water turbine (CWWTS™) is designed to omit the use of rotor, belts and rotor blades. It is designed to substitute for or phase-out previous shaft-mounted rotor blade based turbines.

It is also contemplated to integrate or assemble the components of the CWWTS™ into any shape or space. Due to its space saving concept, there is no need for rotor blades, lengthy shaft and a huge standing structure.

Most components are concealed inside the housing equipped with trappers, such as vanes. The housing rotates due to trapping of fluid flow energy and results in producing electrical power by a concealed generator in the housing. In an embodiment the generator and housing are supported by a center shaft that includes an inner-coil.

As a substitute to the rotor blades and shaft, there is now a housing that is rotating.

Coil rotation can be set to be stationary or rotational. When outer coil is stationary inner-coil rotates, When inner-coil is stationary, outer-coil rotates. Also both inner and outer coils can be set to rotate same time if desired. Concealing electrical power generating generator into the inner structure of housing saves space. The trappers function is to trap fluid flow energy, for example, from wind or water flow.

The housing has these features;
(a) Rotate due to water or wind flow,
(b) Rotate electrical power generating generator concealed inside the housing.
(c) Saving space by omitting shaft and rotor blades,
(d) Conceal the most electric generating components so that they are not exposed to the environment.

Compact wind and water turbine is designed to produce the power as per requirements. Due to its flexible design capabilities; it can be designed for large, medium, small, compact, mini, and micro turbine. It can be integrated into any shapes, in any positions of the structures. A device can be manufactured in any size. It can generate power from minimum to maximum, per requirements. A CWWTS™ can be beneficially incorporated with any moving object that operates on surfaces; air and space, where the moving objects can take advantage of air or water flow energy. When water and air flow energy is constantly rotates the housing, the flow of electron is generated that generates electric current, which can, for example, supply charging current to the power storage device or electrical devices and other components. This enables vehicles operated by electric, battery or power storage devices and hybrid motorized moving objects, to travel for longer period without having to stop for recharging the battery. Besides providing constant and uninterrupted electric power supply, the concealed generator and compact design is a significant feature of this device.

For electric and battery operated moving objects, a significant draw back is the limited travel distances and the time consumed for recharging requirements of the batteries. With the CWWTS™, while the object is moving, the compact wind and water turbine is generating electric current from wind or water flow energy. This resolves an issue for maintaining a constant and certain level of power for the battery to provide electrical power to the electric motorized vehicle.

Compact wind and water turbine system can be installed in any place where energy can be extracted from fluid flow energy by generating electrical current, for example, under or on the surface of flowing water, in any water or air conduits, such as, for example, in water lines, sewer lines, rivers, canals, gas-exhaust pipes and stacks, in any windy location, such as wind farms (where it can substitute for massive rotor blades based, costly, complex, and conventional wind turbines), in addition to on moving objects (either through the water or air) as described above.

Due to its compact design, a CWWTS™ can be integrated into most structures in any position. It can be use for residential applications and reduce the load on the power grid. Installing multiple units can increase the electrical power generating capacity and redundancy.

Clustering multiple compact wind and water turbine system units can increase or decrease electrical power generating capacity and redundancy. Also in case of failure, repair, replace, maintenance or upgrade, is easy and simple. An individual unit can be replaced without shutting down the entire system. Having multiple unit has advantage of running system constantly with minimal to none down time.

Environmental Benefits

The turbine is long regarded as renewal and clean energy source, however, it has not been successfully applied on the surfaces of land, air and space-based vehicles. Compact wind and water turbine is designed to apply for many applications. Air, surface and space based moving objects will benefit most. Also this technology will help reducing carbon foot print and help reduce harmful gas in our environment.

In accordance with one embodiment a compact wind and water turbine comprises housing, trappers, concealed electrical power generating generator comprising of coils, magnets, poles, brushes, bearings, and electrical components, and supporting shaft for housing.

In an embodiment, an electrical generation device comprises:

a housing having an interior hollow and configured to rotate about an axis trappers on the housing that are configured to capture energy from a moving fluid stream to rotate the housing about the axis;

an electrical generator within the interior hollow and constructed and configured with a rotating rotor element within the interior hollow that rotates around the axis with rotation of the housing.

The housing is configured to rotate by the force of the trappers, and includes an interior hollow that is the space enclosed by the housing. Within this space or interior hollow is enclosed the electrical generator, including rotors and stators. In an aspect, essentially all of the moving parts of the electrical generator are enclosed in the hollow, the only components exterior to the hollow being those required for electrical transmission and support of the generator and housing.

In an embodiment, the stator is mounted on a stationary shaft about which the housing rotates. The rotor is attached to the housing, around the stator. The rotor is attached to the housing by mounting the rotor on the interior wall of the housing in the hollow. In another embodiment, the housing and rotor are mounted on a rotating shaft, with the stator disposed within the hollow of the housing. In either of the above embodiments, rotor is first rotor, the stator can function as, or be replaced by a second rotor that also rotates.

Trappers can be attached to the housing or be incorporated integrally, with the housing. The trappers may be of any suitable form, such as paddles, blades, vanes, and the like. The housing may also be shaped to incorporate a trapper or trappers, by forming or molding a housing surface in a shape that functions as an foil in the fluid (e.g., airfoil, hydrofoil) to provide the force to rotate the housing. Accordingly, the housing and trappers can incorporate any suitable shape that captures the fluid-flow energy, including helical designs, blades, paddles, and the like.

The trappers and housing may be designed to function optimally in the environment for which it is intended. For example, on a stationary installation, the housing/trappers combination may be designed to function in fluid flow from any direction (including up and down) to rotate in a clockwise or counterclockwise direction in response to the fluid flow. For moving objects, or where to fluid flow is primarily from one direction, the housing-paddle combination may be designed and oriented to optimally function with fluid flow from that direction, rotating in either a clockwise or counterclockwise direction.

The electrical generator can be of any suitable design that can be incorporated within the hollow of the housing, where a magnetic field is created with a power producing component passing through the magnetic field. The magnetic field component of the generator may be provided by, for example, electromagnets (coils) or permanent magnets mounted on either the rotor or stator. The power producing component or coil may be on either the stator or the rotor or both.

The electrical generator may optionally be constructed as separate component or module. This allows potential use of commercial generators, alternators, dynamos, and the like, used for example in transportation, wind-power installations, and the like. The housing can be designed to accommodate many such existing designs within the housing hollow. In this design the electrical generator would have its own casing disposed within the housing. When used with a vehicle, the electrical generator can function as an alternator with a charging circuit to charge the battery. This is particularly useful for electrically power vehicles.

Alternately, the construction of the housing can integrate components of the electrical generator, such as for example, the mounting of rotor components directly on the wall of housing within the hollow. In this embodiment, the housing can thus function as a casing for the generator. Alternately, the generator may have a separate casing or separate from the housing.

DETAILED DESCRIPTION

Examples

Reference is now made to FIGS. 1, 2, 3, 4, and 5. The illustrated embodiments have a rotating housing 10 with most components concealed or contained in the hollow 11 of the housing 10. Trappers 12 are attached to the housing to capture fluid flow energy and rotate the housing 10 about axis 25. The rotation of the housing activates the electrical generator. By "contained" is meant that the generator occupies the hollow and is essentially surrounded by the housing. By "concealed" is meant that the generator is in the hollow sealed or protected with no or little exposure to the environment.

Figure 1:
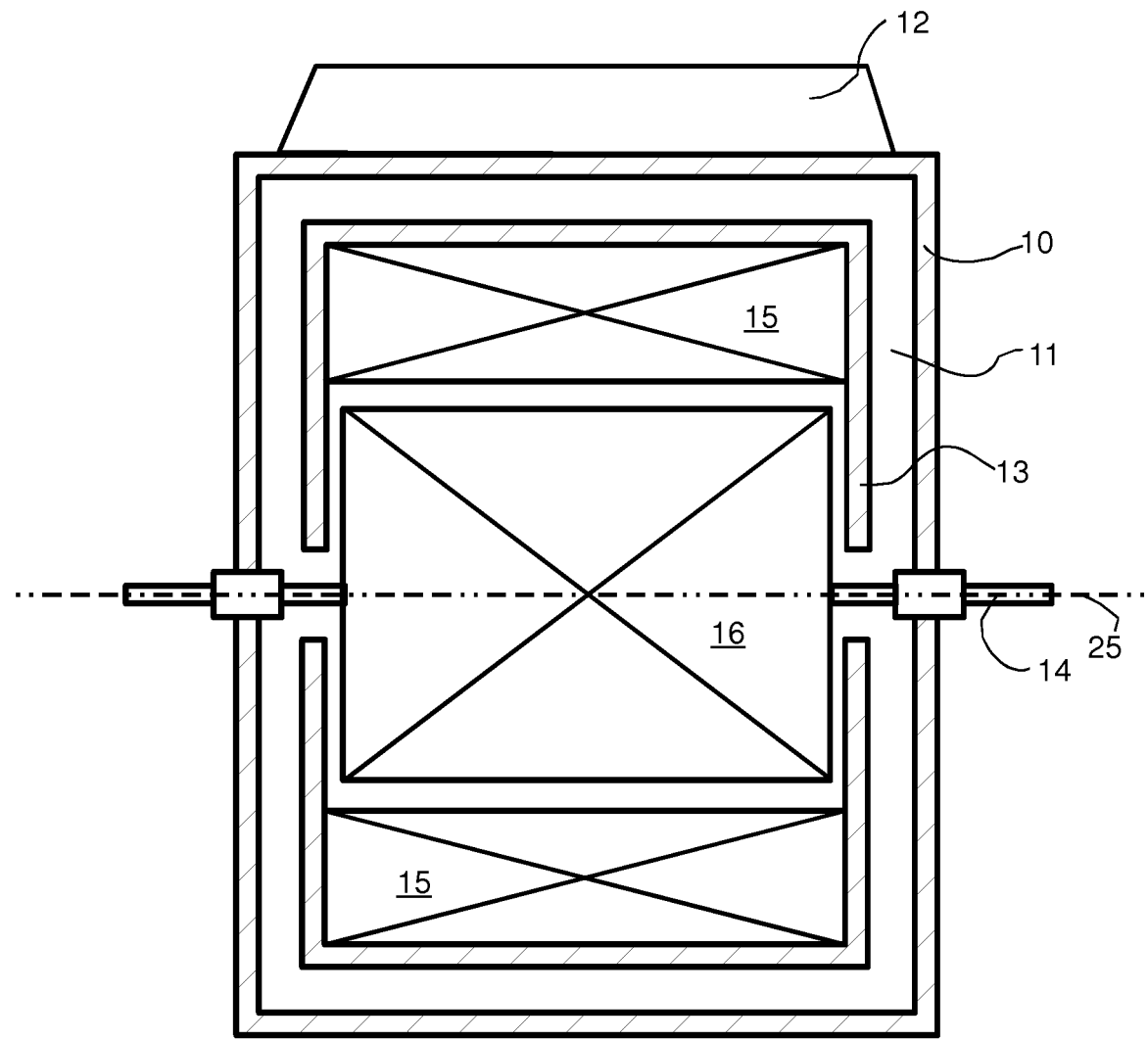
FIG. 1 is a schematic cross-section of an embodiment.

In FIG. 1 the generator comprises a casing 13 enclosing a stator 15 and rotor 16. In this example, the rotor 16 is mounted on a common rotating shaft 14 with the housing, so that as the housing rotates, the rotor is also rotated. The rotor rotates or spins around the axis 25 near or surrounded by one or more stators. The stators 15 are stationary within the generator casing 13, are are mounted by suitable means (such as hollow or concentric shafts—not shown) in a way that also allows rotation of the housing.

Figure 2:
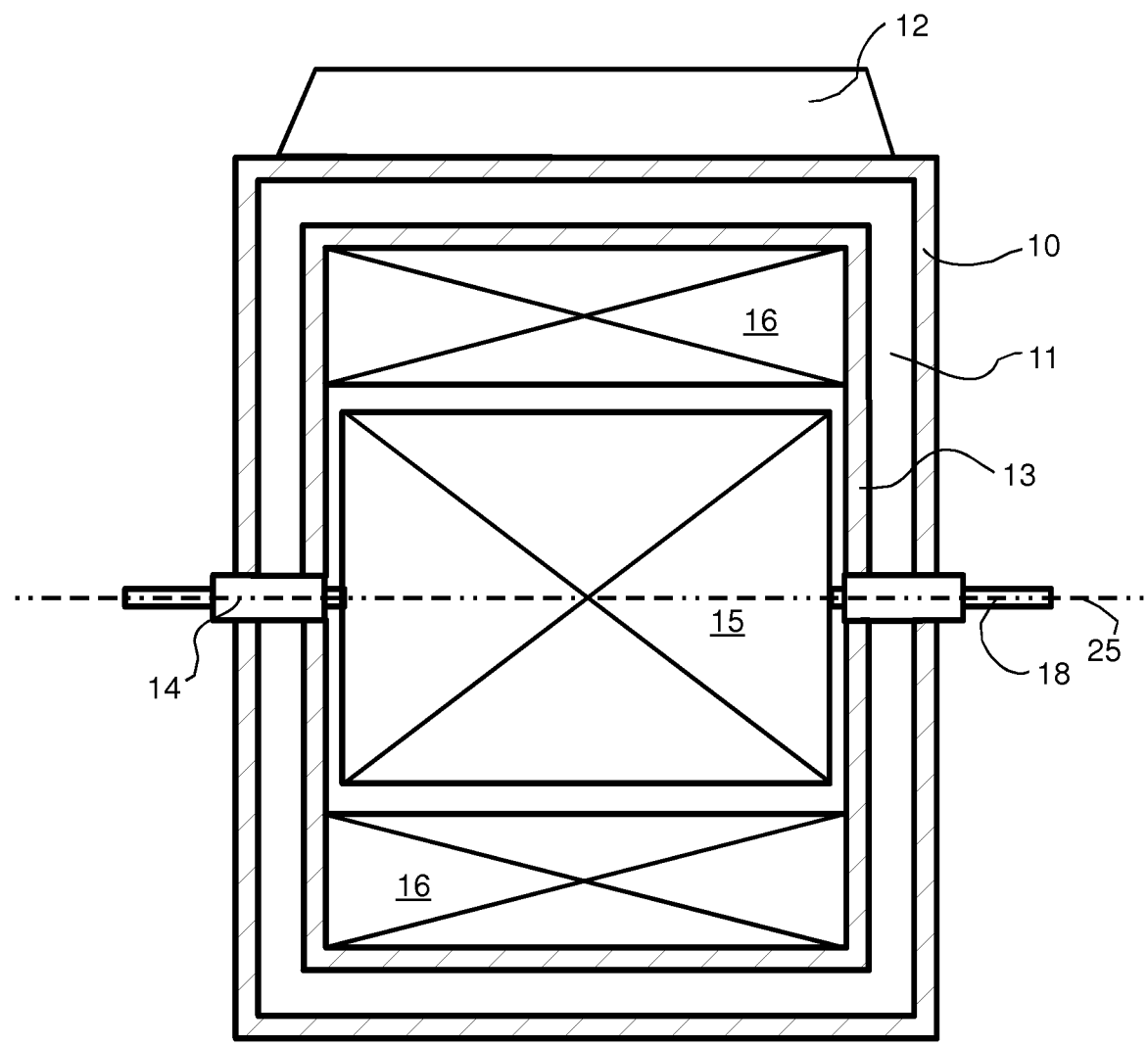
FIG. 2 is a schematic cross-section of another embodiment.

In FIG. 2, the housing 10 the generator casing 13 with attached rotor components 16 (such as coils or magnets) are both attached to a shaft, so that as the housing rotates, the generator casing with enclosed rotor also rotates. A stator 15 is mounted on the axis 25 on a fixed or stationary shaft 18 so that the stator is stationary. The rotor rotates in a revolving motion around the stator. (In the illustration the rotating shaft 14 is hollow to allow passage of the stationary shaft 18.)

Figure 3:
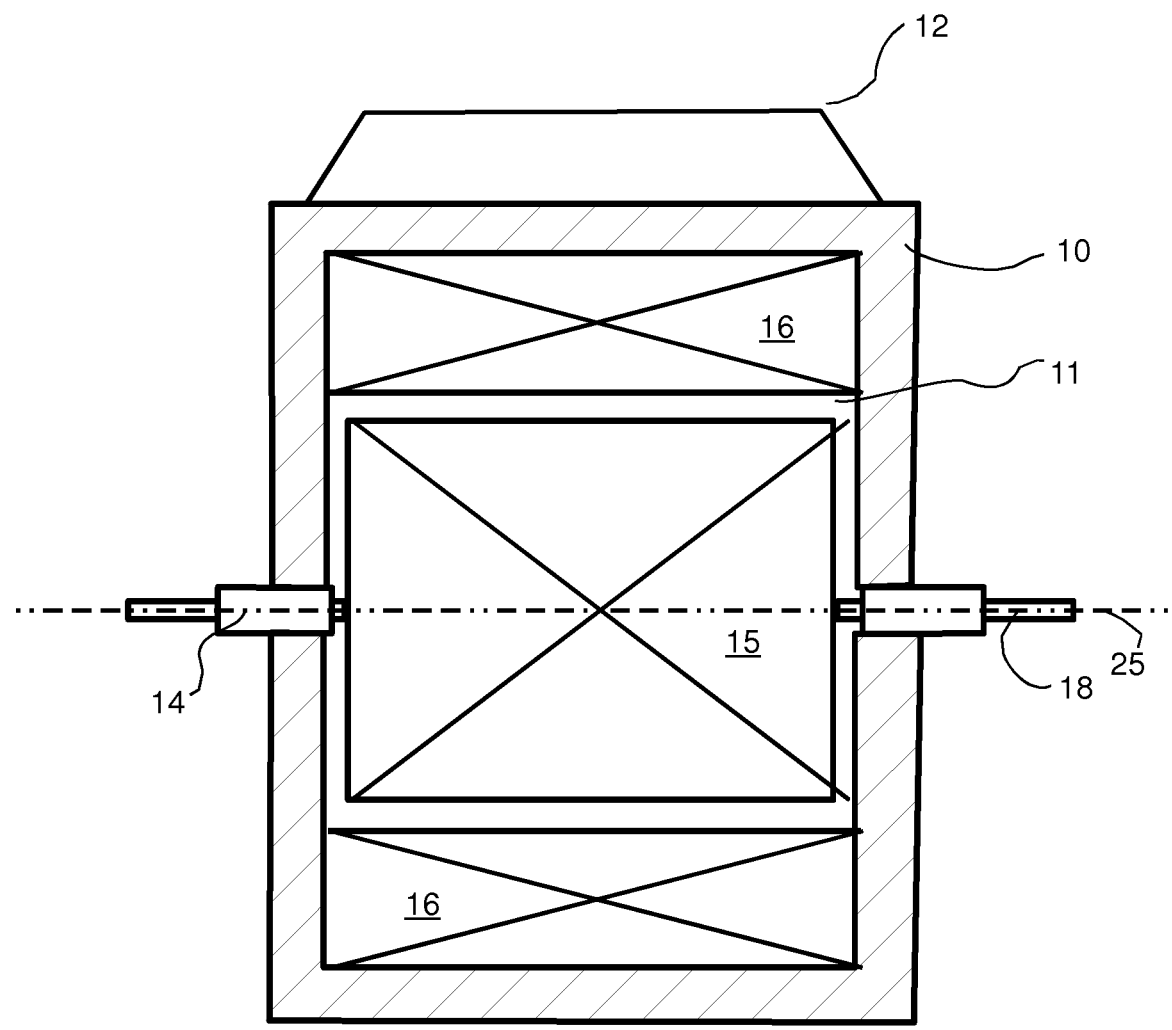
FIG. 3 is a schematic cross-section of yet another embodiment.

In FIG. 3, the housing and generator casing are integrated in a single housing 10 mounted on rotating shaft 14. This embodiment functions the same as that in FIG. 2, with the rotor moving in response to the rotation of the housing by revolving around a stationary stator that is mounted on stationary shaft 18.

Figure 4:
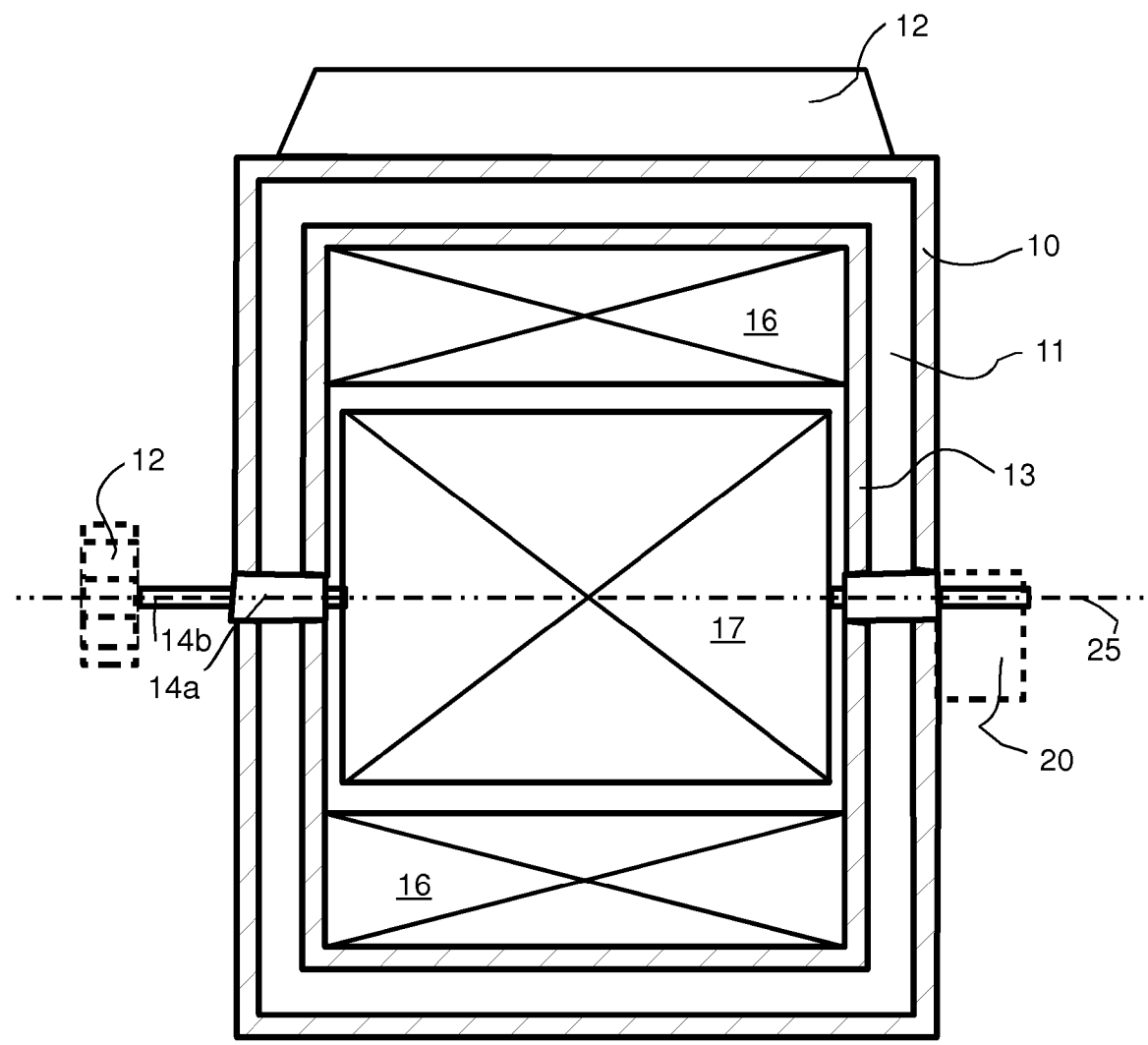
FIG. 4 is a schematic cross-section of yet another embodiment.

The embodiment illustrated in FIG. 4 can be viewed as similar to FIG. 2, except the stators are not stationary but are also rotated, becoming second rotors 17. The housing, generator casing with first rotors 16 are attached to a first rotating shaft 14a, that surrounds a second rotating shaft 14b, upon which is mounted second rotors. The first rotors 16 rotate along with the housing 10 to revolve around the second rotors 17. The second rotors must turn at a different speed and/or different direction from the first rotors, and do not turn directly with the housing.

The second rotors can be rotated by any suitable means, such as, for example, by a trapper system 12 (turbine, or the like) separate from the housing, or by a transmission system 20 that transfers the housing rotation to the second rotors. The trapper system 12 may be any suitable system for capturing energy from the fluid flow, such as turbines, paddles, etc. The transmission 20 may be of any suitable design and may include one or more of gears, pulleys, belts, electrical drives, hydraulic drives, and the like. In an alternate embodiment, the embodiment of FIG. 1 can be modified to turn the stator 15 (which becomes a second rotor), by not mounting the generator casing in a stationary fashion. Instead, a suitable system, such as those disclosed above, can turn the generator casing at a different speed than the housing.

In FIGS. 1, 2, 3, and 4, the generator also includes components for generation and transmission of electricity (not shown). These may include, for example, coils, magnets, poles, brushes, bearings, electrical components, and supporting structures for the shaft, housing, generator casing.

Figure 5:
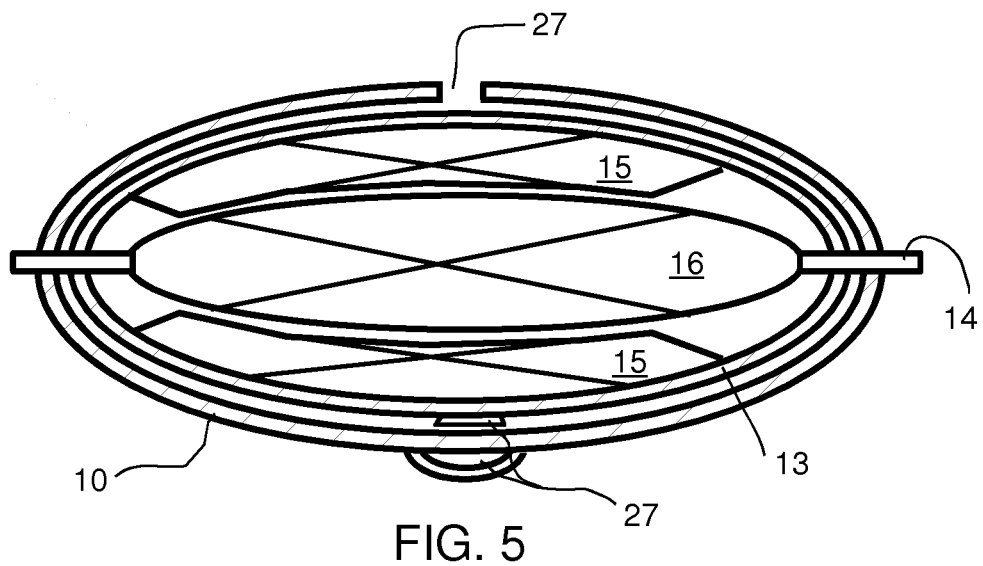
FIG. 5 is a schematic cross-section of yet another embodiment.

Any of the above embodiments can be modified with an aerodynamic or streamlined shape, such to reduce drag losses in the fluid flow. This can be particularly useful in applications with moving objects or vehicles. FIG. 5 is a modification of the system of FIG. 1 with a housing 10, rotating shaft 14 with rotor 16, and stationary generator casing 13 with stators 15. The housing 10 is a rounded aerodynamic shape, with the generator casing 13 configured to fit within the housing. The embodiments of FIGS. 2, 3, and 4 can be similarly modified.

Figure 6:
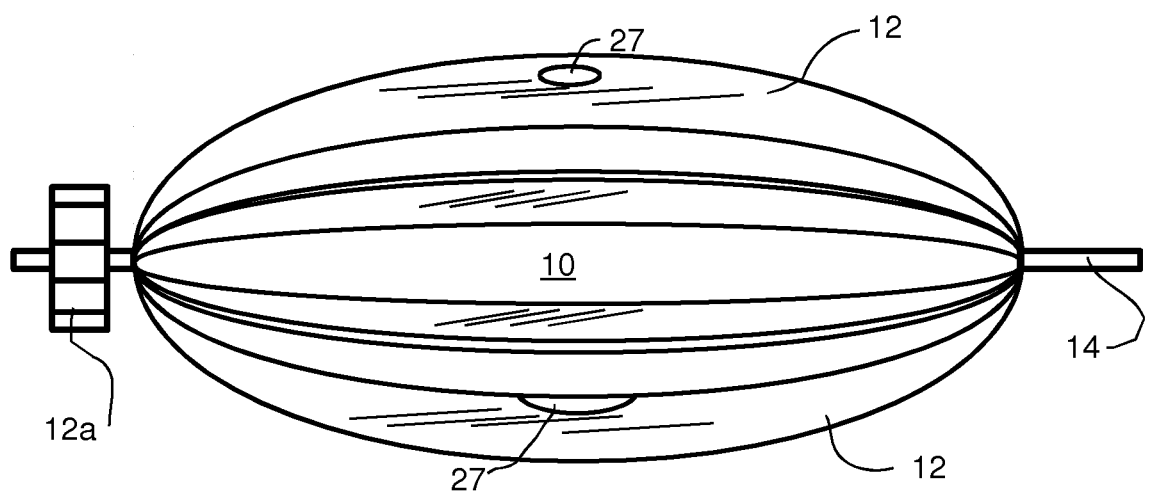
FIG. 6 is a view showing a housing with trappers.

FIG. 6 shows the exterior of an aerodynamic housing 10, with trappers 12, in the form of paddles extending from the housing and extending from one end of the housing to the other. Also shown are trappers 12a mounted on the rotating shaft 14 upon which the housing is mounted.

Also shown in FIGS. 5 and 6 are shown vents or holes 27 in the housing to provide cooling for the electric generator in the hollow. This may be required, particularly for operation in air. In water, the housing a housing may be sealed against water, and cooling vents would probably be unnecessary.

CONCLUSION, RAMIFICATION, AND SCOPE

Most electric and hybrid vehicle cannot commute for long distances and times due to (a) limited battery capacity resulting in running out of juice on the batteries, (b) a long time required to charge batteries.

Also current turbine system with mostly rotor based designs are not practical to install on the vehicle due to; (a) they do not integrate well within the structure of the vehicle. (b) they may require several turbines to provide enough voltage. For fluid (wind and water) designs for generating electric power, they require large spaces and structures. The present compact wind and water turbine system design is versatile, flexible and compact, so that it can overcome these problems.

In addition, the present system can allow easy maintenance, upgrading and installation. It can be designed to integrate within any shape of the structure or shape of a vehicle. Each unit is compact, modular, and independent.

Several units can be installed in an application. Since there are several independent units are installed, if one unit fails, the other unit is still producing power.

The present devices are compact and cost less to manufacture. They are light weight, and can work on or under water, in the air and space. They can be applied to any surface based object, or moving object.

Although the description above contains much specificity, these should not be construed as limiting the scope of the embodiment but as merely providing illustrations of some of the presently preferred embodiment. For example the housing can have any other shapes. Thus the scope of the embodiment should be determined by the appended and their legal equivalents, rather than examples given.

While this invention has been described with reference to certain specific embodiments and examples, it will be recognized by those skilled in the art that many variations are possible without departing from the scope and spirit of this invention, and that the invention, as described by the claims, is intended to cover all changes and modifications of the invention which do not depart from the spirit of the invention.

What is claimed is:

1. A device for generating electrical power from fluid flow energy comprising:
    a housing that rotates, said housing having an interior hollow;
    trappers on the housing that rotate the housing by capturing fluid flow energy,
    an electrical generator contained in the interior hollow of the housing and configured
    with rotating rotor within the interior hollow that rotates with rotation of the housing, wherein the housing rotates about an axis and a stationary stator is disposed not on the axis and the rotor is mounted on the axis to rotate in a spinning motion adjacent to the stationary stator, further wherein the rotor and the stator are contained within a stationary generator casing with the stator attached to the casing, further wherein the rotor is attached to a rotating shaft and the stator is attached to a stationary shaft, and the rotating and stationary shafts are constructed such that one shaft is hollow with the other shaft passing through its interior.

* * * * *